June 14, 1960  J. C. LOZIER  2,940,306
DYNAMIC TRANSDUCER ACCELEROMETER
Filed Dec. 28, 1956  4 Sheets-Sheet 1

INVENTOR
J. C. LOZIER
BY Walter M. Hill
ATTORNEY

INVENTOR
J. C. LOZIER
BY Walter M. Hill
ATTORNEY

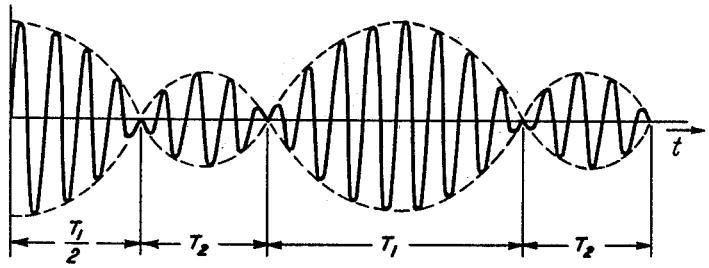
FIG. 5
FIG. 5A
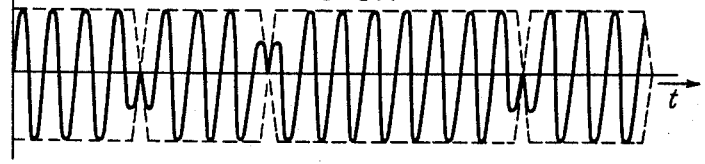
FIG. 6
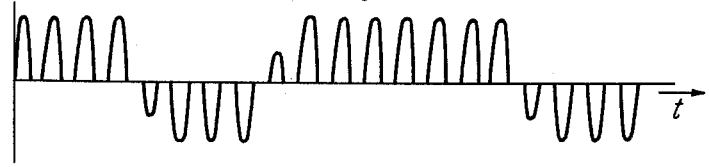
FIG. 7
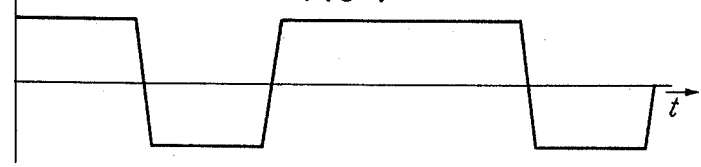
FIG. 8
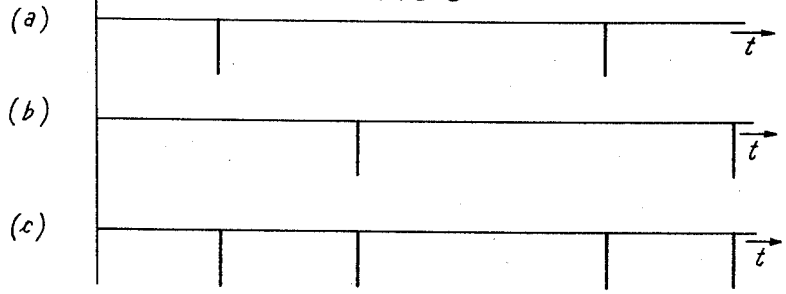
INVENTOR
J. C. LOZIER
BY Walter M. Hill
ATTORNEY INVENTOR
J. C. LOZIER
BY Walter M. Hill
ATTORNEY

United States Patent Office 2,940,306
Patented June 14, 1960

2,940,306

DYNAMIC TRANSDUCER ACCELEROMETER

John C. Lozier, Short Hills, N.J., assignor to Bell Telephone Laboratories, Incorporated, New York, N.Y., a corporation of New York Filed Dec. 28, 1956, Ser. No. 631,348

14 Claims. (Cl. 73—71.2)

This invention pertains to means for measuring dynamic quantities, and particularly to means for transducing a dynamic quantity such as acceleration to a proportionate time duration or electrical value.

Since a change in the velocity of motion of a physical mass constitutes an acceleration of the mass, devices for controlling motion often include an "accelerometer" for measuring the acceleration involved. Most aircraft, for example, include an accelerometer in their complement of flight instruments to provide the pilot with essential data concerning the motion of the aircraft. Instruments for determining the ability of equipment to withstand vibration generally rely on an accelerometer to determine the magnitude of the vibration. More recently, accelerometers have been included in inertial guidance systems for automatically controlling the flight of high speed aircraft.

In view of the fact that the acceleration of a physical mass is proportional to the resultant force applied to the mass, devices which determine the magnitude of a force by measuring the acceleration of a reference mass on which it acts may also be broadly considered to be accelerometers. A microphone having a moving element would fit into this category, since the varying air pressures which constitute acoustic waves exert varying forces on the diaphragm of the microphone resulting in a proportional variation in acceleration of the element. The magnitude of the electrical signal produced by the microphone depends on the velocity of the moving element, so that the changes in velocity produced by the acceleration cause corresponding changes in signal amplitude. In such systems the accelerometer operates as a transducer for converting a dynamic quantity, i.e., the acceleration of the moving element of the microphone, to a proportional electrical value.

Most accelerometers include a reference mass which is simultaneously subjected to both the accelerating force to be measured and to a restraining force of known or calculable magnitude. A spring is often used to provide the restraining force, since the magnitude of that force will be proportional to the displacement of the mass from its rest position and so is readily ascertained. Other means, such as a pendulum, have been utilized to subject a reference mass supported thereby to a measurable force which restores it to a reference position. However, in all such arrangements the unkown acceleration is measured by bringing the reference mass to a statically stable position at which the unknown acceleration and the acceleration due to the restraining force are equal and opposite. Static friction, or "stiction," therefore, affects the measurement, and since it is variable in magnitude it constitutes a source of indeterminate error. Even more importantly, the restraining force is measured either as a spring displacement or as an electrical current or voltage. Measurement of such quantities to a consistently high degree of accuracy over a very wide range of relative accelerations is virtually impossible to achieve.

Accelerometers involving a principle known as "inertial control" have been developed for use in making vibration measurements. As described on pages 52 through 55 of "The Electronic Control Handbook," by R. R. Batcher and W. Moulic, Caldwell-Clements, Inc., New York, 1946 in a typical instrument of this kind a frame carrying a magnet is affixed to the vibrating body and a lightweight wire coil is supported by springs from the frame so it can move easily in the magnetic field. The magnet vibrates with the vibrating body, but the coil lags behind due to its own inertia. This induces a voltage in the coil proportional to the acceleration of the vibrating body. Accelerometers of this type, of course, would not be suitable for measuring an unchanging acceleration since the moving coil would soon come to rest relative to the frame. Also, as explained in the cited text, the natural frequency of oscillation of the coil limits the range of frequencies of vibration over which reasonably accurate measurements can be made. That is, the characteristics of the springs for suporting the coil, which largely determine the natural frequency of oscillation, constitute a limitation on the accuracy and range of measurement.

Accordingly, a principal object of the invention is to provide a dynamic accelerometer wherein the measurement of acceleration is accomplished in terms of time intervals so that the accuracy of the measurement is only limited by the accuracy with which time intervals can be measured. A further object is to provide a dynamic accelerometer wherein the effects of stiction and of the natural frequency of oscillation of the accelerometer reference mass on the accuracy of measurement are both virtually eliminated.

A further object is to provide an improved acceleration responsive dynamic transducer of high accuracy which may be readily adjusted to measure accelerations encompassing a range of relative magnitudes of a million to one.

A further object is to provide an acceleration responsive dynamic transducer for accurately establishing the values of electrical quantities based on gravitational acceleration as a comparison standard.

A further object is to provide an acceleration responsive dynamic transducer for producing a coded electrical signal representing the changing amplitude of an accelerating force.

In accordance with the invention, a reference mass is caused to oscillate in either a rectilinear or curvilinear path about a null position. This is accomplished by establishing a regenerative feedback loop which subjects the mass to a driving force of constant magnitude virtually always directed toward the null, the driving force reversing in direction each time the mass crosses the null. Position sensing means, which may be of electrical, electromagnetic, or photoelectric design so as not to impose any significant physical retarding influence on the mass, detects each instant at which the null is crossed and produces a signal which actuates switching means for reversing the driving force. In the absence of any external accelerating force acting on the reference mass it will oscillate symmetrically about the null, spending an equal time on each side thereof. However, if such a force exists in one of the directions of motion, the mass will spend more time on the corresponding side of the null and less on the other side. Applicant has ascertained that the ratio of the difference of these times to their sum is proportional to the magnitude of the externally applied acceleration. The sensitivity with which this ratio is established is directly dependent on the magnitude of the driving force acting on the reference mass relative to that of the external acceleration force. By reducing the driving force the sensitivity of measurement can be established at a high level for small values of accelerating force, but large accelerating forces can also be measured by sufficiently increasing the driving force.

A complete system in accordance with the invention may include means responsive to the signals produced by the position sensing means to actuate timing means for measuring the time intervals referred to. Such timing means may produce an output in the form of groups of pulses representing the value of the acceleration in a digital code. Alternatively, the output may be in the form of an electrical signal the time duration of which is proportional to the acceleration. Obviously, such a time modulated electrical signal could be converted to a proportional electrical amplitude by applying it to a suitable low pass filter.

In one embodiment the invention is adapted to produce a series of pulses representing in a digital code the instantaneous amplitudes of points on the waveform of a time-varying accelerating force such as that exerted on the moving element of a dynamic microphone by accoustic waves. For such an application the moving element of the microphone is itself utilized as part of a reference mass which is caused to oscillate in response to a driving force.

In another embodiment of the invention the reference mass comprises a coil which is supplied with reversible driving current of constant amplitude. The coil is located in a magnetic field which, by electromagnetic interaction, subjects it to a reversible driving force. The driving current is caused to reverse when the coil is at a point in its path of motion other than that to which the force of gravity tends to restore it, and an additional direct current is applied to the coil to cause it to spend equal times on each side of the gravitational null position. Any change in the value of this additional current would become readily apparent by virtue of the appearance of an inequality in these times. A servo control loop may be established for automatically adjusting the additional current to maintain the time equality, so that the additional current supplied to the coil will be constant relative to gravity as a standard of comparison.

An embodiment of the invention generally similar to the foregoing may be utilized in an inertial navigation system. For such an application the magnitude of the driving current in the coil may be maintained constant by external means, and a servo control loop established to operate means for controlling the orientation relative to earth of a frame supporting the coil so as to maintain equality between the times the coil spends on either side of the null position. The orientation of the frame will then indicate the direction of the total accelerating force to which the coil is subjected, i.e., the vector sum of the accelerating force due to gravity and any other accelerating force applied to the frame.

Other features of the invention are set forth in the following specification and accompanying drawings, in which:

Fig. 5 is a graph showing the time variation of the probe voltage induced in the probe coil of Fig. 4;

Fig. 5A is a graph showing the time variation of the probe voltage after having been limited by the limiter of Fig. 4;

Fig. 6 is a graph showing the time variation of the voltage produced by the phase sensitive detector of Fig. 4;

Fig. 7 is a graph showing the time variation of the voltage produced by the direct current amplifier of Fig. 4;

Figure 3:
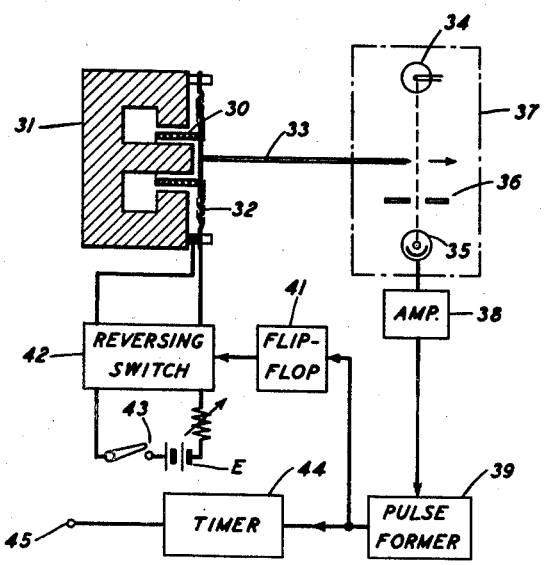
Fig. 3 is a circuit diagram, partially in block form, of an embodiment of the invention utilizing photoelectric means for sensing the position of the reference mass.
Figure 4:
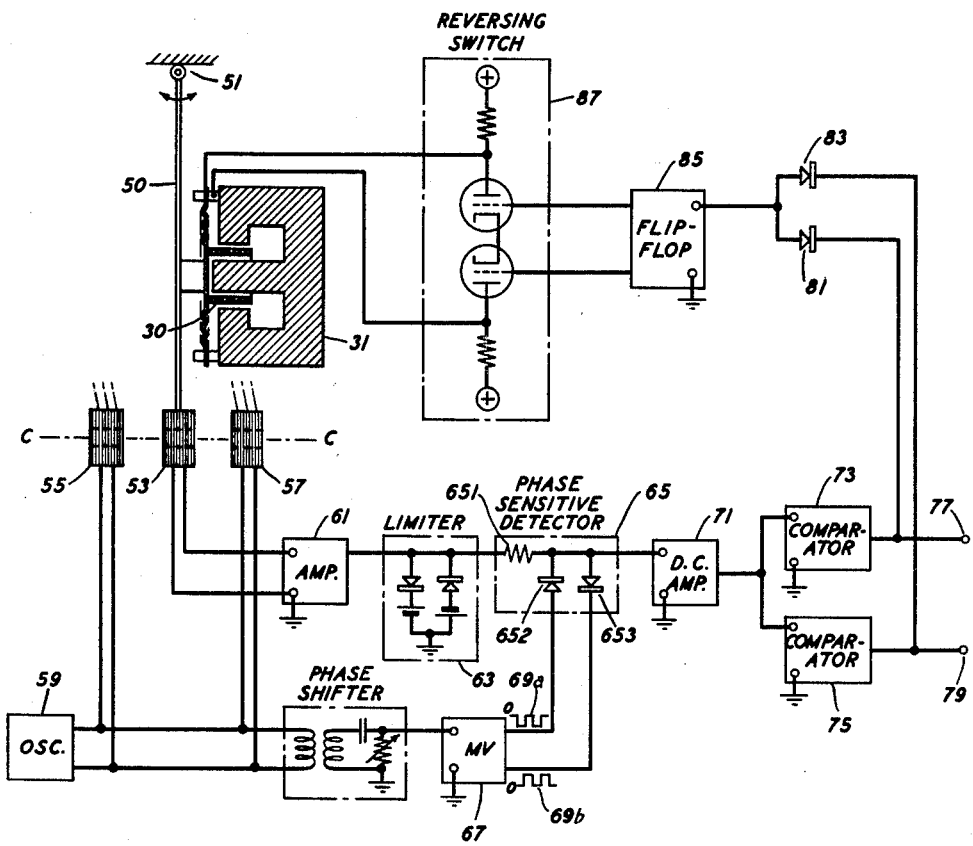
Fig. 4 is a circuit diagram, partially in block form, of an embodiment of the invention utilizing electromagnetic means for sensing the position of the reference mass.
Figure 12:
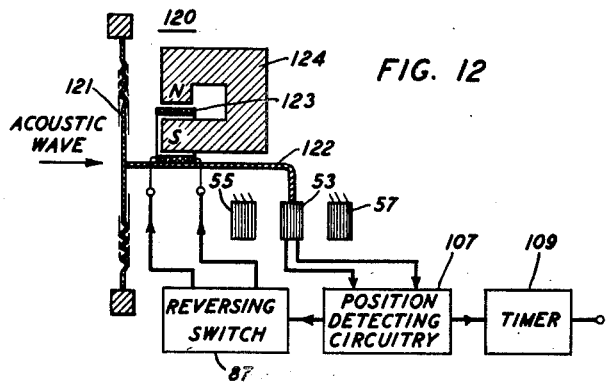
Figure 9:
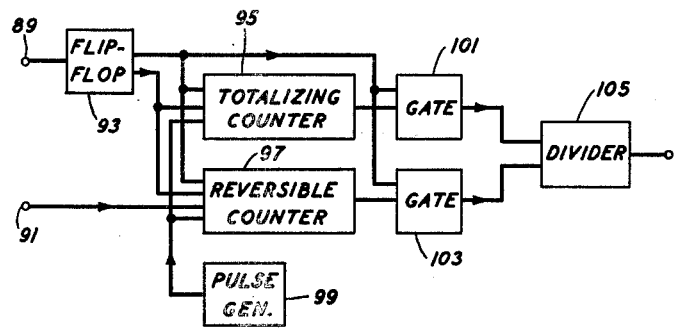
Figure 10:
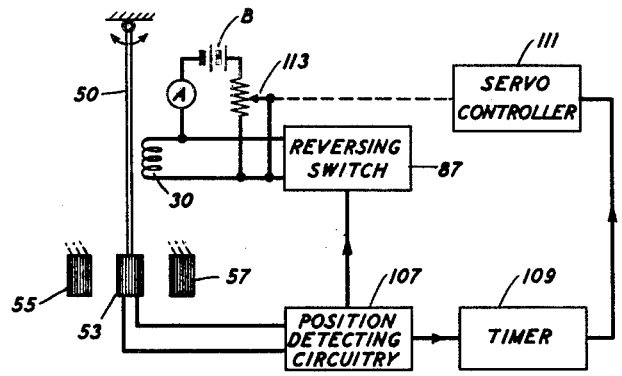
Figure 11:
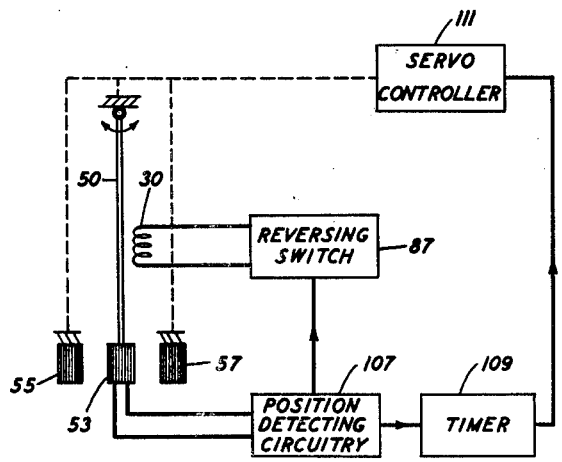

Fig. 8 is a graph showing the time variation of the voltage produced (*a*) by comparator 73; (*b*) by comparator 75; and (*c*) at the output of diodes 81 and 83, all of Fig. 4;

Fig. 9 is a block diagram of timing means which may be utilized with the circuit of either Fig. 3 or Fig. 4 to provide a digital pulse code signal representing the value of the measured acceleration;

Fig. 10 is a block diagram of a servo loop comprising an accelerometer constructed in accordance with the invention and arranged to establish a reference value of current based on gravity as a standard of comparison;

Fig. 11 is a block diagram of a servo loop comprising an accelerometer constructed in accordance with the invention for determining the direction of a resultant acceleration due to gravity and an applied accelerating force;

Fig. 12 is a diagram, partially in block form, of a moving coil microphone comprising an accelerometer constructed in accordance with the invention which provides a pulse code output signal representing the instantaneous amplitude variations of acoustic waves applied to the microphone.

Figure 1:
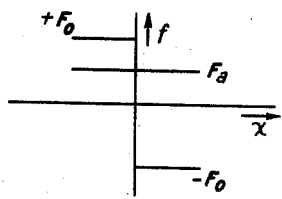
Fig. 1 is a force versus displacement diagram illustrating the relation between the displacement of a reference mass which moves in accordance with the invention and the forces acting on the mass.

The theoretical basis underlying the invention will be explained with reference to Fig. 1. This shows the relation between the linear displacement of a reference mass along an axis "$x$" in response to a reversible driving force $F_0$ and a constant accelerating force $F_a$. The displacement will be considered positive when to the right of the point at which $x=0$, which defines the null position of the mass. When the mass is located to the right of null the driving force $F_0$ acting on it is directed to the left, and so is negative; while when the mass is to the left of null the driving force $F_0$ is directed to the right and is positive. The "$f$" ordinates of Fig. 1 represent force magnitudes, and are positive when above the zero axis. As shown in Fig. 1, the accelerating force $F_a$ is constant in magnitude and direction, being always directed to the right, and is smaller than the driving force $F_0$. If the mass suubjected to these forces is "$m$," the applicable equations of motion, with the time origin chosen to coincide with one of the instants at which the velocity of the mass is zero, are:

$$m\ddot{x} = -F_0 + F_a \quad x>0$$
$$m\ddot{x} = F_0 + F_a \quad x<0 \quad (1)$$

$$\dot{x} = \left(\frac{-F_0+F_a}{m}\right)t \quad x>0$$
$$\dot{x} = \left(\frac{F_0+F_a}{m}\right)t \quad x<0 \quad (2)$$

$$x = \left(\frac{-F_0+F_a}{2m}\right)t^2 + k_1 \quad x>0$$
$$x = \left(\frac{F_0+F_a}{2m}\right)t^2 - k_2 \quad x<0 \quad (3)$$

The constants $k_1$ and $k_2$ are the peak amplitudes of positive and negative displacement, respectively.

In Fig. 2*a* is shown a graph of the time variation of the net force acting on the mass. Since the resultant acceleration is proportional to that force, this graph also represents the time variation of acceleration of the mass. Fig. 2*b* shows the parabolic variation of the displacement of the mass with time, in accordance with Equation 3. As shown, $T_1$ and $T_2$ are the half periods of each complete cycle of oscillation of the mass about the null. To complete the description of motion, Fig. 2c shows the variation of the velocity of the mass with time.

Half periods $T_1$ and $T_2$ can be evaluated by applying the law of mechanics that the impulse applied to a mass is equal to the change in momentum it produces. If net force is denoted by "$f$,"

$$\int_{t_1}^{t_2} f\,dt = m(v_2 - v_1) \quad x > 0$$

$$\int_{t_2}^{t_3} f\,dt = m(v_3 - v_2) \quad x < 0 \quad (4)$$

Figure 2:
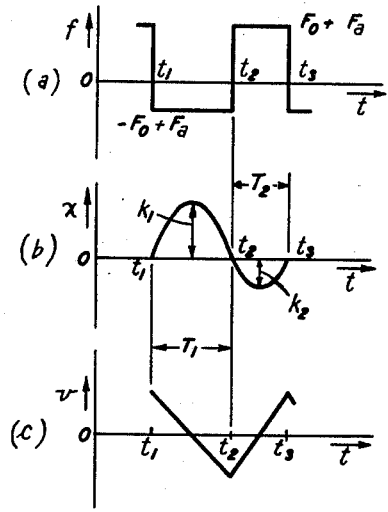
Fig. 2 is a set of diagrams illustrating the time variation of the forces acting on a reference mass which moves as contemplated by the invention and the accompanying variations in its motion, part (*a*) showing the force versus time variation, part (*b*) showing the displacement versus time variation and part (*c*) showing the velocity versus time variation.

In Equation 4, the limits of integration are the times indicated in Fig. 2, and the velocities are those which, respectively, exist at those times. If the reference mass is in the condition of steady state oscillation, wherein all features of its motion repeat in successive cycles, the velocity must be the same at the end of each cycle as at the beginning of the next. Consequently, $v_1 = v_3$, and $$\int_{t_1}^{t_2} f\,dt = -\int_{t_2}^{t_3} f\,dt \quad (5)$$

Reference to Figs. 2a shows that $f = F_0 + F_a$ during the interval $t_1$ to $t_2$ and that $f = F_0 + F_a$ during the interval $t_2$ to $t_3$. Also, $t_2 - t_1 = T_1$ and $t_3 - t_2 = T_2$. Applying these relations to Equation 5 gives $$(-F_0 + F_a)T_1 = -(F_0 + F_a)T_2$$

$$\frac{F_a}{F_0} = \frac{T_1 - T_2}{T_1 + T_2} \quad (6)$$

If the acceleration of the mass due to force $F_a$ is denoted by $a_x$, $$F_a = m a_x$$

Substituting this in Equation 6 gives $$a_x = \frac{F_0}{m}\left(\frac{T_1 - T_2}{T_1 + T_2}\right) \quad (7)$$

Since the driving force $F_0$ is constant in magnitude, Equations 6 and 7 show that the external force applied to the mass, and the acceleration it produces, are each proportional to the ratio of the difference in times that the mass spends on each side of the null position to the sum of those times. Consequently, by measuring these times an unknown acceleration can be determined. The constant $$\frac{F_0}{m}$$

may be calculated by separately measuring $F_0$ and $m$, or can be evaluated by subjecting the mass to a known accelerating force such as gravity.

The foregoing analysis made no reference to the effect of viscous friction, i.e., a retarding force proportional to the velocity of the mass. In an actual physical system an oscillating mass is, of course, subjected to such friction and so loses energy in each cycle of oscillation. The effect is to tend to gradually reduce the amplitude of oscillation of the mass, eventually bringing it to rest. To prevent this it is necessary that energy be supplied to the mass, in each cycle, equal to that lost to friction. Energy will be so supplied if the instant of reversal of the driving force applied to the mass is delayed for a brief interval subsequent to the instant at which the mass crosses the null. In any actual system such a delay is inevitably present as a result of physical limitations such as amplifier bandwidth, coil inductance, etc. The amplitude of oscillation will, therefore, be stable.

The particular embodiment of the invention shown in Fig. 3 utilizes the electromagnetic interaction between a current-carrying coil 30 and a constant magnetic field produced by either a permanent magnet or electromagnet to provide the requisite driving force for causing the coil to oscillate along its axis. From Equation 6 above it is apparent that, with a given accelerating force $F_a$, the value of $$\frac{T_1 - T_2}{T_1 + T_2}$$

can be increased by decreasing the driving force $F_0$. That will increase the sensitivity with which the accelerating force of the resultant acceleration is measured. Of course, the driving force $F_0$ must always be greater than $F_a$ in order for the mass to oscillate as described. Conversely, if the applied force is very large, the value $$\frac{T_1 - T_2}{T_1 + T_2}$$

can be kept within a desired range of magnitudes by increasing driving force $F_0$. Since the driving force in the arrangement in Fig. 3 is electromagnetic, it is proportional to the number of turns of coil 30, the current therein, and the strength of the magnetic field in which the coil is located. By adjusting one or more of these quantities, preferably the current since that is most conveniently controlled, a desired driving force magnitude can be established.

Inasmuch as a conventional electrodynamic loudspeaker comprises a current-carrying coil disposed in a magnetic field as described, such a device may be conveniently utilized to provide both a reference mass and a driving force as contemplated by the invention. That is, coil 30 may be the voice coil and magnet 31 the field of a conventional loudspeaker. Coil 30 is supported in a customary manner by a flexible center suspension 32 which permits free axial motion of the coil relative to magnet 31. In place of the normal loudspeaker cone, a light, rigid, opaque blade 33 is coaxially affixed to coil 30 by suspension 32. Blade 33 has a sharp terminating edge in the plane perpendicular to that of the drawing. The terminals of coil 30 are brought out to a suitable binding post where electrical connections can be made to them. In the absence of current in the coil, and if no axial accelerating force is applied thereto, it will come to rest at a null position and the edge of blade 33 will be at its own corresponding null position. The blade edge then just intercepts the path of a beam of light between a radiant source 34 disposed at one side of the blade and a photocell 35 at the other side. A narrow slit 36 may be interposed between light source 34 and photocell 35 to assure that light cannot reach the latter except along a sharply defined line passing through the null position of the edge of blade 33. Source 34, the edge of blade 33, photocell 35, and slit 36 together comprise a position detecting means 37 which is responsive to changes in the position of coil 30.

Photocell 35 is connected to an amplifier 38, the output voltage of which is applied to a pulse former 39. The latter is a circuit designed to produce a sharp negative time marker pulse each time amplifier 38 receives a signal from photocell 35 and a sharp positive time marker pulse each time amplifier 38 ceases receiving a signal therefrom. This pulse generating function may be performed by a simple capacitive differentiating circuit, of which many types are well known in the art. The output terminal of pulse former 39 is connected to a flip-flop circuit 41 having two stable operating states which alternate in response to successive time marker pulses. Each reversal of states reverses the polarity of the voltage between the output terminals. Flip-flop circuit 41 is connected to a reversing switch 42, which produces an output voltage across its output terminals which reverses in polarity in response to each reversal of the polarity of the voltage applied to its input terminals. A typical reversing switch circuit is discussed hereinafter. Reversing switch 42 is energized by a source of direct voltage potential E in series with a manually operable switch 43 and a current adjusting rheostat. The output terminals of reversing switch 42 are connected to the terminals of voice coil 30.

To provide output information, pulse former 39 is connected to a timer 44 which may comprise a pair of pulse counters together with suitable arithmetic dividing and controlling means, as described in more detail hereinafter. Depending on its construction, timer 44 may produce at its output terminal 45 an electrical signal of a magnitude proportional to the acceleration to which coil 30 is subjected, or it may produce a visual record of the value of that acceleration, or it may produce a series of pulses which represent the value of the acceleration in a digital code.

The relative polarities of the output voltage of amplifier 38, the direct voltage of source E, and the polarity reversal produced by reversing switch 42, may be chosen so that when photocell 35 is dark reversing switch 42 causes the current in coil 30 to flow in a direction which results in deflecting it to the left along its axis. Consequently, if switch 43 is closed when coil 30 is at rest the coil will imediately be deflected toward the left. This permits the beam of light from source 34 to reach photocell 35, resulting in reversal of the output voltage of amplifier 38. Pulse former 39 then produces a time marker pulse which results in a reversal of the existing state of flip-flop circuit 41, thereby causing reversing switch 42 to reverse the direction of the current supplied to coil 30. Coil 30 is then subjected to a driving force directed toward the right along its axis. The result is that the initial movement of blade 33 toward the left is gradually halted, and it is then driven toward the right at increasing speed. When the edge of blade 33 again crosses its null position the light beam from source 34 is again prevented from reaching photocell 35. The output voltage of amplifier 38 reverses once more, and pulse former 39 provides a time marker pulse which causes flip-flop 41 to return to its initial state. This returns reversing switch 42 to its initial state, and the current supplied to coil 30 is in a direction which subjects it to a driving force directed toward the left along its axis.

From this description it is evident that coil 30, its suspension 32, and blade 33 together comprise a reference mass which moves under the influence of a reversible constant amplitude driving force always directing that mass toward a fixed rest position. The system of Fig. 3 therefore conforms to the system discussed above with reference to Figs. 1 and 2, and the entire analysis applicable thereto also applies to the system of Fig. 3. The accelerating force $F_a$ would, in Fig. 3 be established by a constant accelerating force acting on coil 30 tending to move it axially in one direction. Such a force will exist if the frame supporting the accelerometer in Fig. 3 is accelerated in a direction parallel to the axis of coil 30. The ratio of the difference in times that the edge of blade 33 is on opposite sides of its null position to the sum of those times will be proportional to the magnitude of the acceleration. To derive that ratio, the first time marker pulse from pulse former 39 may be utilized in timer 44 to start each of two counters which are supplied with a uniformly occurring train of clock pulses. The succeeding time marker pulse, which occurs when the edge of blade 33 again crosses its null position but moving in the reverse direction, may then be utilized to cause one of the counters to reverse, thereby subtracting from the total already reached. The third following time marker pulse, which denotes completion of one oscillatory cycle of motion of blade 33 and coil 30, may then be utilized to stop both counters and to gate their totals simultaneously to arithmetic means which divides the total produced by the reversible counter by that produced by the other counter. An obvious alternative arrangement would be to utilize the first time marker pulse to start a first counter, the succeeding pulse to stop that counter and start a second counter, and the next pulse to stop the second counter. $T_1$ and $T_2$ would thereby be separately measured, and could be indicated as such or applied to arithmetic means to calculate the ratio of their difference to their sum.

The ratio of the described time difference to time sum will be directly proportional to the acceleration being measured, and the absolute value can be determined by calibrating the accelerometer. This may be accomplished by subjecting coil 30 to a known axial accelerating force, which is easily produced by tilting the entire assembly, including magnet 31, to a known angle relative to the direction of the gravity vector of the earth. The component of gravitational acceleration "$g$" parallel to the axis of coil 30 will then be the product of the value of "$g$" (which is very accurately known) and the cosine of the angle by which the coil axis is tilted from the gravity vector. If this quantity is divided by the numerical value supplied by computer 44 the quotient will be the value of the constant $$\left(\frac{F_0}{m}\right)$$

in Equation 7 above. The arithmetic means in timer 44 could be designed to multiply the quotient it produces, as described above, by the value of $$\left(\frac{F_0}{m}\right)$$

so that the resultant output of the timer will be the actual value of the measured acceleration. Alternatively, if the application in which the accelerometer is to be used does not require completely automatic computation, the two counters in computer 44 could be of the type which produce their totals visually, so that an observer can manually divide them. If the accelerometer is to be used in a control system where the object is only to prevent or compensate for changes in acceleration from zero, the output of the reversible counter alone can serve as the requisite control signal. This is because the output of the reversible counter will change when the acceleration changes, so that by adjusting either the magnitude or instants of reversal of the driving force $F_0$ to maintain the control signal at zero the acceleration will also be maintained at zero.

One of the reasons the accelerometer of the instant invention is capable of a much greater degree of accuracy than prior accelerometers is that its output does not depend on an absolute time interval but rather on the ratio of the times that the reference mass spends on each side of its null position. This can be made apparent by dividing the numerator and denominator of the right side of Equations 6 and 7 above by $T_2$, whereby the ratio $$\frac{T_1}{T_2}$$

becomes the only variable. Consequently, the period of self-oscillation of the reference mass does not affect the accuracy of measurement. Another reason for the higher accuracy is the fact that the constant oscillations of the reference mass tend to eliminate the effects of dynamic friction as well as stiction, the former existing equally in both direction of motion of the mass and so cancelling out in net affect. Of course, a variation with position of the restoring action of suspension 32 would affect the results since the average position of the reference mass would then change with the direction and magnitude of the acceleration being measured. Such an effect can, however, be balanced out by experimentally establishing the null position of the edge of blade 33 as that point about which the times spent on each side are equal when no accelerating force exists.

It should be noted that any delay in determining when the edge of blade 33 crosses the null position is automatically compensated for because the signal from amplifier 38 is utilized both to reverse the driving force applied to coil 30 and to actuate the counters in timer 44. This situation is further helped by the fact that time intervals marked by pulses are the easiest and most accurate of all analogue quantities to measure by counting clock pulses.

While the accelerating force acting on coil 30 has been considered constant in the foregoing description, the accelerometer can be designed to perform equally well in the case where that force and the resultant acceleration vary with time. The regenerative oscillatory system involved may be regarded as a pulse width modulator which averages the magnitude of the acceleration once in each oscillatory cycle. If the sampling rate, and consequently the frequency of oscillation, is more than three times the highest frequency of variation of the acceleration, the latter will be measured substantially the same as if it had been constant during each measuring interval.

Fig. 4 discloses an embodiment of the invention utilizing electromagnetic means in lieu of the photoelectric means of Fig. 3 for sensing the position of the oscillating reference mass. The reference mass and the means for subjecting it to a driving force are the same as in Fig. 3, and include the voice coil 30 and magnet 31 of an electrodynamic loudspeaker structure as shown also in Fig. 3. However, instead of driving a blade 33 as in Fig. 3, coil 30 is here mechanically coupled to the lower portion of a pendulum 50 which is free to swing in the plane of the drawing about a supporting pin 51 anchored to a rigid frame (not shown). The free end of pendulum 50 rigidly supports a probe coil 53 which is wound so that a varying flux along the axis (shown by the center-line c—c) will induce a voltage therein. On either side of and coaxial with coil 53 are two exciting coils 55 and 57. These exciting coils are rigidly supported in position by a frame (not shown) which may, but not necessarily, be the same frame which anchors pin 51. These coils are wound so that with the same current supplied to each they produce opposing fluxes along the axis of coil 53. That is, when coil 55 produces flux directed toward the right along the axis coil 57 produces flux directed to the left along the axis, and vice versa. Both exciting coils are supplied with sinusoidal alternating current by an oscillator 59 which operates at a very high frequency relative to the frequency of oscillation of pendulum 50 produced by driving coil 30. In a typical case, if the pendulum frequency is 100 cycles per second, oscillator 59 may operate at 2 megacycles per second. When probe coil 53 is midway between exciting coils 55 and 57, which is the case when pendulum 50 is at rest, the voltages induced in coil 53 by the alternating fluxes from stationary coils 55 and 57 are equal and opposite and the net induced voltage is zero. This position of probe coil 53 is the null. When the probe coil moves along its axis to the right of its null, the voltage induced therein by coil 57 exceeds that induced by coil 55 and results in a net induced probe voltage. Similarly, when the probe coil moves to the left of its null the voltage induced therein by coil 55 will exceed that induced by coil 57 and a net probe voltage will be again produced. These net induced probe voltages will be mutually opposed, or 180 degrees out of phase, so that the phase of the probe voltage at the terminals of probe coil 53 indicates on which side of null it is located at any time. Consequently, coils 53, 55 and 57 together with oscillator 59 constitute a position sensing means as contemplated by the invention. To indicate orders of magnitude, the air space between coil 53 when in its null position and each of coils 55 and 57 may be one-eighth of an inch, and the maximum displacement of coil 53 from its null may be three or four mils. This small amplitude of oscillation, together with a relatively long pendulum, say five inches, assures that the motion of coil 53 will have only a negligible component perpendicular to the coil axis, so that accelerating forces perpendicular to the axis will not affect the measurement. To insure that coil 53 is not affected by any stray ambient electric influences, it may be surrounded by a Faraday electrostatic shield.

Probe coil 53 is connected to an amplifier 61 which amplifies the probe voltage and applies it to limiter 63 to eliminate all voltage amplitudes exceeding predetermined fixed positive and negative levels. That is, as pendulum 50 oscillates probe coil 53 is brought closer to and then further from each of stationary coils 55 and 57 in turn, so that the amplitude of the probe voltage continually varies. Since it is desired to determine only the instants when that voltage becomes zero, limiter 63 is required to prevent the large voltage amplitude fluctuation from affecting the operation of subsequent circuits. As shown in Fig. 4, limiter 63 may simply comprise a pair of oppositely poled diodes connected in parallel across the output terminal of amplifier 61 and each biased in the nonconducting direction. They will, therefore, limit the amplitude of the voltage at the output of limiter 63 to lie between the positive and negative biasing voltages. Limiters of this type are discussed in more detail on pages 271 to 275 of the text "Electronic Analog Computers," by Korn and Korn, McGraw-Hill Book Company, 1952.

In Fig. 5 there is shown a typical waveform of the probe voltage obtained from coil 53. This is a modulated wave, the carrier being the voltage of oscillator 59 and the modulating envelope being the parabolic variation with time of the displacement of coil 53 along its axis, as required by Equation 3 above. Fig. 5a shows the waveform of the probe voltage after having been limited as described.

Phase sensitive detecting means may be readily devised by those skilled in the electronic circuit art for detecting each instant at which the limited probe voltage becomes zero, and for also detecting whether it does so from a positive or a negative direction. Those instants will correspond to each crossing of the null position by pendulum 50 regardless of direction. A typical phase sensitive detector 65 may comprise a resistor 651 connected between the input and output terminals and a pair of oppositely poled diodes 652 and 653 of which the cathodes of the former and the anode of the latter are connected to the detector output terminal. These diodes are subjected to biasing voltages 69a and 69b, respectively, produced at the two output terminals of a multivibrator 67. Voltages 69a and 69b are phase opposed square waves of the same frequency, voltage 69a varying between zero ground potential and a negative value and voltage 69b varying between zero potential and an equal positive value. Voltage 69a is applied to the anode of diode 652 and voltage 69b is applied to the cathode of diode 653, so that these diodes are simultaneously rendered nonconductive during the non-zero half cycles of each of those voltages. Multivibrator 67 is synchronized by oscillator 59, so that the frequency of voltages 69a and 69b is the same as that of oscillator 59 and of the probe voltage induced in coil 53. To assure that the square wave voltages are at their non-zero values precisely during alternate half cycles of the limited probe voltage at the output of limiter 63, oscillator 59 is connected to multivibrator 67 through an adjustable phase shifter. This may conveniently comprise a transformer having its primary connected to oscillator 59 and its secondary shunted by a capacitor and rheostat in series. The voltage across the rheostat will be of the same frequency as that of oscillator 59, but will be shifted in phase relative thereto by an amount dependent on the relative magnitudes of the resistor and the capacitive impedance. This voltage is applied to multivibrator 67 to synchronize it in known fashion.

During the alternate half cycles of the limited probe voltage of the output of limiter 63 when diodes 652 and 653 are rendered nonconductive the output voltage from phase sensitive detector 65 will be virtually the same as the output voltage from limiter 63. However during the remaining alternate half cycles of the limited probe voltage one of diodes 652 and 653, depending on the polarity of the probe voltage, will be conductive and will render the output voltage of phase sensitive detector 65 zero because virtually all the probe voltage applied thereto by limiter 63 will be absorbed by resistor 651. By adjusting the magnitude of the rheostat in the phase shifter until the output voltage from detector 65 reaches a maximum level during alternate half cycles, voltages 69a and 69b produced by multivibrator 67 will be in their non-zero half cycles precisely during alternate half cycles of the limited probe voltage produced by limiter 63.

In Fig. 6 there is shown a typical waveform of the detected probe voltage produced at the output of phase sensitive detector 65. When probe coil 53 is at one side of its null position only positive half cycles of the voltage induced therein will be detected. However, when the coil crosses to the other side of its null position, thereby reversing the phase of the voltage induced therein, only the negative half cycles of that voltage are detected.

The detected probe voltage is applied to a conventional direct current amplifier 71 which includes a filter to eliminate the high frequency variations of the detected probe voltage. The output signal from amplifier 71 therefore has the waveform shown in Fig. 7, comprising only the trapezoidal envelope of the detected probe voltage. This signal is applied to each of a pair of comparators 73 and 75, comparator 73 producing a sharp negative pulse whenever the signal voltage from amplifier 71 passes through zero in going from a positive to a negative value and comparator 75 producing such a pulse whenever the signal voltage from amplifier 71 passes through zero in going from a negative to a positive value. Since the signal waveform in Fig. 7 has sloping rising and falling sides, comparators of the type which respond to rising and falling triangular waveforms may be utilized. Devices of this type are well known in the art, a variety being described on pages 335 through 350 of the text "Waveforms," volume 19, Massachusetts Institute of Technology Radiation Laboratory Series, McGraw-Hill Book Company, 1949. These comprise some type of voltage sensitive trigger circuit which is normally biased to a quiescent state by an applied "reference voltage" but which is triggered to an alternate state when an applied signal voltage exceeds the amplitude of the reference voltage. When so triggered, the trigger circuit produces a negative output pulse. A specific comparator particularly suitable for use in the arrangement in Fig. 4 is that utilizing a blocking oscillator, as shown in Fig. 9.19 on page 342 of the cited text. The "reference voltage" at which the blocking oscillator is triggered would be set at ground potential. If a specific comparator circuit is designed to handle only positive-going triangular signal voltages, it can be easily adapted to handle negative-going signals by interposing an inverting amplifier. Alternatively, a comparator circuit utilizing transistors may be adapted to respond to signal voltages of either polarity by choosing transistors of the proper type. These considerations are matters of engineering design which will be apparent to those skilled in the art of electronic pulse generating and shaping circuitry.

In Figs. 8a and 8b, respectively, are shown the output pulses produced by comparators 73 and 75. By comparison with Figs. 5 to 7 and the description thereof, it is seen that these pulses occur at the instants at which probe coil 53 crosses its null position, so that they may be utilized to control timing means to measure the times during which that coil is on each side of null as described above. Terminals 77 and 79 are provided to permit connection to timing means for this purpose. In addition, the comparator output pulses are combined into a single pulse train, as shown in Fig. 8c, by connecting the output terminals of comparators 73 and 75, respectively, to a pair of negatively poled diodes 81 and 83 having their output terminals connected together and to the input terminal of a flip-flop circuit 85. The latter has two stable operating states, and switches between them in response to each input pulse. In each of its states flip-flop 85 produces two phase opposed voltages at its two output terminals, one being highly positive when the other is at or near ground potential. The one of these terminals which is at the high positive potential alternates each time the state of flip-flop 85 alternates. These output voltages are applied to a reversing switch 87 to control the direction of current flow produced in voice coil 30 by the source symbolically shown in reversing switch 87. Many types of electronic circuits for performing the function of reversing switch 87 are known. One such circuit, shown in Fig. 4, comprises a pair of vacuum tube amplifiers having their grids respectively connected to the output terminals of flip-flop 85 and their anodes connected across the terminals of voice coil 30. The direction of the current produced in coil 30 will depend on which of the terminals of flip-flop 85 is at the most positive potential, and will, consequently, reverse each time the state of the flip-flop is reversed.

It should be noted that, if coil 53 is initially at rest when operating potential is applied to all the component circuits in Fig. 4, there is a chance that the state of reversing switch 87 will be such as to cause coil 53 to continue to move away from the null position in the same direction as it may be initially displaced relative thereto. This would force pendulum 50 to "lock-up" in an extreme position. Such a condition could be terminated, and normal oscillation initiated, by manually disturbing pendulum 50 to move coil 53 to the opposite side of the null position, since the pulse produced by either of comparators 73 and 75 when the null is crossed would reverse the state of flip-flop 85 and so would reverse switch 87. The same result could, if desired, be accomplished automatically by connecting direct current sensitive means between the output terminal of amplifier 71 and the input terminal of flip-flop 85. Such means might simply comprise a low pass filter. If pendulum 50 is oscillating the output voltage of amplifier 71 is oscillatory, having the waveform shown in Fig. 7. The low pass filter would then provide only a very small output voltage which would not affect flip-flop 85. However, if pendulum 50 should "lock-up" as described, the output voltage of amplifier 71 would be at a constant quiescent value. The low pass filter would then build up a sufficiently large output voltage to cause the state of flip-flop 85 to reverse.

Fig. 9 is a block diagram of a timer suitable for use with the embodiments of the invention shown in Figs. 3 and 4. In the case of the arrangement of Fig. 3, as previously described, pulse former 39 provides time marker pulses of alternating polarity as the edge of blade 33 alternately crosses its null position from opposite directions. By applying those pulses to a pair of oppositely poled diodes connected in parallel, the positive and negative pulses can be separated. A phase inverting amplifier could be connected to the positively poled diode to invert the positive pulses to pulses of negative polarity, so that two separate trains of negative pulses would be obtained. In the case of the circuit of Fig. 4, two separate trains of negative pulses are produced directly at terminals 77 and 79. Consequently, a timer designed to receive trains of negative pulses on two separate leads is suitable for use in the circuit of Fig. 4 directly, and in the circuit of Fig. 3 with the described modification. A typical timer of this type is shown in block form in Fig. 9.

In Fig. 9, one series of pulses, each of which denotes a crossing of the null position by the reference mass moving in one direction, is applied to input terminal 89.

The other series of pulses, each denoting a crossing of the null position by the reference mass moving in the other direction, is applied to input terminal 91. Terminal 89 is connected to a flip-flop 93 which reverses its state in response to each pulse applied thereto and provides a positive pulse alternately at each of its two output terminals. One output terminal is connected to the start terminal of a totalizing counter 95 and also to the start terminal of a reversible counter 97. Counters 95 and 97 are supplied with uniformly spaced clock pulses from a pulse generator 99, and begin counting the number of such pulses which are received following application of a pulse to their start terminals. Once the start terminal of reversible counter 97 has been pulsed, a subsequent pulse at its reversing terminal causes it to count in reverse, subtracting at a uniform rate from the count previously reached. The reversing terminal is connected to timer input terminal 91.

When the reference mass crosses the null position in the opposite direction from that which caused counters 95 and 97 to begin operating, the pulse which is applied at terminal 91 causes reversible counter 97 to begin counting in reverse. When the reference mass again crosses the null position moving in the same direction as originally, flip-flop 93 is pulsed to its reverse state by receipt of another pulse at terminal 89, and produces a positive pulse at its alternate output terminal. The latter is connected to the reset terminal of each of counters 95 and 97, and causes them to reset to their original states of zero count. Counters 95 and 97 thereafter remain inactive during the next cycle of oscillation of the reference mass. The alternate output terminal of flip-flop 93, when pulsed as described, also actuates two electronic gates, or "AND" circuits, 101 and 103 connected respectively to the outputs of counters 95 and 97. The totals therein then pass through the gates as a series of binary coded pulses. The output terminal of gate 101 is connected to the divisor terminal and the output terminal of gate 103 is connected to the dividend terminal of a divider designated in block 105 which produces the quotient of the binary quantities applied thereto. The output of divider 105 may either be a visual display or an electrical quantity. In the latter case, the output may be an analog voltage having an amplitude proportional to the quotient and so to the measured acceleration. Alternatively, the output voltage of divider 105 could be a binary coded pulse series.

It should be understood that a timer as described with reference to Fig. 9 may comprise either analog or digital counting and dividing circuitry or combinations of both. Various analog dividers are discussed on pages 230 to 233 of the above-cited text, "Electronic Analog Computers," by Korn and Korn. Analog timers or counters generally comprise circuits wherein a voltage of uniformly increasing amplitude is started by a pulse occurring at the start of an interval to be measured and stopped by a pulse occurring at the end of that interval. Such circuits are discussed on pages 535 to 537 of the above-cited text "Waveforms." Various digital counters are discussed in Chapter 7 of the text, "Arithmetic Operations in Digital Computers," by R. K. Richards, D. Van Nostrand Company, 1955. A suitable type of reversible binary counter is described in the article, "A Transistor Reversible Binary Counter," by R. L. Trent, appearing on pages 1562 through 1573 of the November 1952 issue of the Proceedings of the Institute of Radio Engineers, volume 40, No. 11.

Fig. 10 is a block diagram of an embodiment of the invention for establishing a reference value of current in voice coil 30 based on gravity as a standard of comparison. This embodiment operates in the same manner as that of Fig. 4 and includes all components thereof. The block 107 designated "Position Detecting Circuitry" includes all the circuitry of Fig. 4 except reversing switch 87, which is shown separately in the interests of clarity of description. The timer in block 109 may be of the type described above with reference to Fig. 9, or a simplified variation of that arrangement wherein only a reversible counter is utilized and the output voltage produced is proportional to the difference in the times probe coil 53 spends on either side of its null. The output of timer 109 is applied to a servo controller 111 which produces a total shaft rotation proportional to the magnitude of that output. The shaft of servo controller 111 is mechanically linked to the shaft of a potentiometer 113 which is connected in series with an ammeter A and a direct current source B across the terminals of voice coil 30. If a constant accelerating force acts on coil 30, this entire servo loop will reach stability with the slider of potentiometer 113 at a position such that the direct current applied to coil 30 from source B establishes a deflecting force just equal and opposite to the accelerating force. The output of timer 109 will then be zero, and the shaft of servo controller 111 will remain at rest. Any changes in the direct current flowing through coil 30 from source B will immediately result in asymmetrical oscillation of coil 30 about its null, producing an output voltage from timer 109 which causes servo controller 111 to move the arm of potentiometer 113 to restore the current in coil 30 to its initial value. The current supplied to coil 30 is thereby maintained constant with reference to the accelerating force acting on it. If that force is derived from the force of gravity, as by tilting the frame supporting exciting coils 55 and 57 relative to the horizontal, the current in coil 30 will be constant relative to the force of gravity. A highly accurate laboratory standard of current is thereby provided.

If the orientation relative to earth of the supporting frame for the entire accelerometer in Fig. 10 should change so that the null position of probe coil 53 no longer lies midway between exciting coils 55 and 57, asymmetrical oscillation of the probe coil will be produced which will result in production of an output from timer 109. That output may be applied to actuate a servo controller 111, the shaft of which adjusts the orientation of the supporting frame relative to earth. Such an arrangement is shown in Fig. 11, the shaft of servo controller 111 being mechanically coupled to means (not shown) for rotating the accelerometer frame in the plane of the drawing. The orientation of the supporting frame thereby indicates the direction of the total accelerating force acting on the accelerometer. That information may be utilized, in accordance with known techniques, in an inertial guidance system for a vehicle in which the accelerometer is carried.

As stated above, the invention is well suited to the measurement and expression in pulse code form of changing accelerations. For such applications it is only necessary that the frequency of oscillation of the reference mass be at least three times the highest frequency to be encoded. If the acceleration is changing very rapidly, as in the case of the diaphragm of a microphone subjected to sound, the attainment of a high frequency of oscillation requires that the reference mass have very low inertia. Either a moving coil or velocity ribbon type microphone, both of which comprise a moving element which may be supplied with current to cause it to oscillate in a magnetic field, will serve as such a reference mass in the same way as voice coil 30 in the embodiment of the invention described above with reference to Fig. 3. A block diagram of such an arrangement is shown in Fig. 12, and comprises a moving coil microphone 120 having a diaphragm 121 mechanically linked by an arm 122 to a voice coil 123 free to move axially in a magnetic field established by a magnet 124. This microphone construction is typical of those widely used, and is shown in Fig. 6.9 on page 152 of the textbook, "Acoustics," by L. L. Beranek, McGraw-Hill Book Company, 1954. For use with an electromagnetic position sensing system, arm 122 supports a probe coil 53 the same as that shown in Fig. 4. The probe coil thereby moves axially in accordance with the motion of diaphragm 121. A reversing switch 87 is connected to coil 123, and is controlled by position detecting circuitry 107 as described with reference to Fig. 10. A binary digital timer 109, which may be of the type described above with reference to Fig. 9 produces a series of groups of pulses of which each group represents in binary code an instantaneous sample of the amplitude of displacement of diaphragm 121. These pulse groups occur successively at a rapid rate relative to the highest frequency in the acoustic waves applied to microphone 120, so that the entire series of groups constitutes the binary coded variation of the force exerted on diaphragm 121. The acoustic waves producing that variation are thereby directly encoded into binary form.

What is claimed is:

1. A dynamic transducer accelerometer comprising a reference mass capable of free motion about a reference position, means for applying a driving force of substantially constant magnitude to said mass to cause it to move toward said reference position along a predetermined path of motion, means for reversing the direction of said driving force each time said mass crosses said reference position, and position sensing means for producing a timing signal whenever said mass crosses said reference position.

2. The transducer of claim 1, further comprising timing means connected to said position sensing means for determining the difference in the time intervals during which said reference mass is at opposite portions of said path with respect to said reference position.

3. The transducer of claim 1, further comprising timing means connected to said position sensing means for determining both the sum and difference of the time intervals during which said reference mass is at opposite portions of said path with respect to said reference position.

4. The transducer of claim 1, further comprising timing means connected to said position sensing means for determining the time intervals during which said reference mass is at opposite portions of said path with respect to said reference position.

5. A dynamic transducer accelerometer comprising a reference mass capable of free motion about a null position, means for applying a reversible driving force of substantially constant magnitude to said mass to cause it to oscillate about said null position, and position sensing means for producing a first signal each time said mass crosses said null position from one direction and a second signal each time said mass crosses said null position from the opposite direction.

6. A dynamic transducer accelerometer comprising a reference mass capable of free motion about a reference position, means for applying a driving force of substantially constant magnitude to said mass to cause it to move along a predetermined path of motion, position sensing means for producing a first signal each time said mass crosses said reference position along said path from one direction and a second signal each time said mass crosses said reference position from the opposite direction, and switching means connected to said driving force means and controlled by the signals from said position sensing means for causing said driving force to be directed in said opposite direction substantially during the intervals between the times of occurrence of each of said first signals and the next succeeding second signal and to be directed in said one direction substantially during the intervals between the times of occurrence of each of said second signals and the next succeeding first signal.

7. An acceleration responsive control system comprising a reference mass, driving means for applying a reversible driving force of substantially constant magnitude to said mass to cause it to oscillate about a selected null position, position sensing means for producing a first signal each time said mass crosses said null position from one direction and a second signal each time said mass crosses said null position from the opposite direction, timing means connected to said position sensing means for producing a control signal when the interval between occurrence of a first signal and the next succeeding second signal differs from the interval between occurrence of a second signal and the next succeeding first signal, and servo control means actuated by said timing means for causing said driving means to adjust said driving force to maintain said control signal at a preselected value.

8. An acceleration responsive control system comprising a reference mass, driving means for applying a driving force of substantially constant magnitude to said mass to cause it to move along a predetermined path of motion, position sensing means for producing a first signal each time said mass crosses a reference position along said path from one direction and a second signal each time said mass crosses said reference position from the opposite direction, switching means connected to said driving means and controlled by said position sensing means for causing said driving force to be directed in said opposite direction substantially during the intervals between the time of occurrence of each of said first signals and the next succeeding second signal and to be directed in said one direction substantially during the intervals between the time of occurrence of each of said second signals and the next succeeding first signal, and servo control means actuated by said position sensing means for so establishing said reference position that the intervals between said signals are maintained equal.

9. An acceleration responsive control system comprising a reference mass, driving means for applying a driving force of substantially constant magnitude to said mass to cause it to move along a predetermined path of motion, position sensing means for producing a first signal each time said mass crosses a reference position along said path from one direction and a second signal each time said mass crosses said reference position from the opposite direction, switching means connected to said driving means and controlled by said position sensing means for causing said driving force to be directed in said opposite direction substantially during the intervals between the time of occurrence of each of said first signals and the next succeeding second signal and to be directed in said one direction substantially during the intervals between the time of occurrence of each of said second signals and the next succeeding first signal, auxiliary driving means for applying an auxiliary driving force to said mass in one of said directions along said path, and servo control means controlled by said position sensing means for so adjusting the magnitude of said auxiliary driving force that the intervals between said signals are maintained equal.

10. A dynamic transducer accelerometer comprising an electrical coil, means for supplying a substantially constant current to said coil, means for establishing a constant magnetic field to subject said coil to a substantially constant driving force in a direction determined by the relative directions of said field and the current in said coil, switching means for reversing the relative directions of said magnetic field and the current in said coil, position sensing means for detecting each instant at which said coil crosses a reference position, means connected to said position sensing means for causing said switching means to so establish the relative directions of said magnetic field and the current in said coil that said driving force is substantially always directed toward said reference position, and pulse generating means connected to said position sensing means for producing a time marker pulse each time said coil crosses said reference position.

11. A dynamic transducer accelerometer comprising an electrical coil, means for supplying a substantially constant current to said coil, means for establishing a constant magnetic field to subject said coil to a substantially constant driving force in a direction determined by the relative directions of said field and the current in said coil, switching means for reversing the relative directions of said magnetic field and the current in said coil, a source of radiant energy, radiant energy detecting means for producing a position sensing signal when radiant energy from said source is admitted thereto, means movable with said coil for preventing radiant energy from said source from reaching said detecting means when said coil is displaced in one direction from a reference position and for admitting radiant energy from said source to said detecting means when said coil is displaced in the opposite direction from the same reference position, pulse generating means connected to said detecting means for producing a time marker pulse whenever a position sensing signal is initiated and another time marker pulse whenever such a signal is terminated, means connected to said pulse generating means for causing said switching means to reverse the relative directions of said magnetic field and the current in said coil in response to each of said time marker pulses, and timing means connected to said pulse generating means and actuated by said time marker pulses.

12. A dynamic transducer accelerometer comprising an electrical driving coil, means for supplying a substantially constant current to said driving coil, means for establishing a constant magnetic field to subject said driving coil to a substantially constant driving force in a direction determined by the relative directions of said magnetic field and said current, switching means for reversing the relative directions of said magnetic field and said current, a probe coil mechanically attached to said driving coil so that it may be displaced from a reference position by an amount proportional to the displacement of said driving coil in response to said driving force, means for establishing oppositely directed alternating electromagnetic magnetic fields on either side of said probe coil and at points spaced away from said reference position, whereby a probe voltage is induced in said probe coil having a phase determined by the direction of the displacement of the probe coil from said reference position, pulse generating means connected to said probe coil for producing a time marker pulse whenever the phase of said probe voltage reverses, means connected to said pulse generating means for causing said switching means to reverse the relative directions of said magnetic field and the current in said driving coil in response to each of said time marker pulses, and timing means connected to said pulse generating means and actuated by said time marker pulses.

13. A system for directly encoding the amplitude of an acoustic wave into a digital pulse code, comprising a microphone having a voice coil which moves in accordance with the acoustic wave applied to the microphone, switching means for supplying reversible substantially constant direct current to said voice coil, a probe coil mechanically attached to said voice coil so that it may be displaced from a reference position by an amount proportional to the displacement of said voice coil in response to the acoustic wave, means for establishing oppositely directed alternating electromagnetic fields on either side of said probe coil and at points spaced away from said reference position, whereby a probe voltage is induced in said probe coil having a phase determined by the direction of the displacement of the probe coil from said reference position, pulse generating means connected to said probe coil for producing a time marker pulse whenever the phase of said probe voltage reverses, means connected to said pulse generating means for causing said switching means to reverse the direct current supplied to said voice coil in response to each of said time marker pulses, and digital timing means connected to said pulse generating means to receive said time marker pulses and adapted to produce groups of pulses of which each group represents a digital code value proportional to the ratio of the difference in the intervals during which said probe coil is displaced on opposite sides of said reference position to the sum of those times.

14. In a device for providing an output which is a measure of an external accelerating force, the combination of a mass capable of free motion about a null position, driving means for applying a reversible substantially constant amplitude driving force to said mass, position sensing means connected to said driving means for generating a pulse and for reversing said driving force each time said mass crosses said null position, a timing means connected to said position sensing means to receive said pulses and produce a signal determined by the relative intervals between successive pulses.

References Cited in the file of this patent
UNITED STATES PATENTS

| | | |
|---|---|---|
| 1,948,104 | Firestone | Feb. 20, 1934 |
| 2,049,129 | McNeil | July 28, 1936 |
| 2,447,863 | Kent | Aug. 24, 1948 |
| 2,498,997 | McLean | Feb. 28, 1950 |
| 2,660,062 | Frowe | Nov. 24, 1953 |
| 2,696,566 | Lion | Dec. 7, 1954 |
| 2,819,052 | Dudenhausen | Jan. 7, 1958 |
| 2,846,207 | Marggraf | Aug. 5, 1958 |